United States Patent
Johnson et al.

(10) Patent No.: US 6,463,262 B1
(45) Date of Patent: *Oct. 8, 2002

(54) RADIO TELEPHONE

(75) Inventors: Keith Philip Johnson, Bracknell; Steven Mote, Charlton Musgrove; Philip Kenneth Roderick Bateman, Chavey Down; Mark Biagi, Ayr, all of (GB)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,742

(22) Filed: Jul. 1, 1999

(30) Foreign Application Priority Data

Aug. 4, 1998 (GB) .............................................. 9816895

(51) Int. Cl.⁷ ................................................ H04B 1/02
(52) U.S. Cl. .................... 455/90; 455/550; 379/433.01; D14/137; D14/138
(58) Field of Search .......................... 455/90, 566, 575, 455/550, 425, 412, 413; 379/428.01, 431, 433.01, 434, 428.02; D14/137, 138

(56) References Cited

U.S. PATENT DOCUMENTS

| | | | |
|---|---|---|---|
| 5,657,370 A | | 8/1997 | Tsugane |
| 6,073,027 A | * | 6/2000 | Norman et al. ........ 379/433.06 |
| 6,208,874 B1 | * | 3/2001 | Rudisill et al. ............. 455/550 |
| 6,282,436 B1 | * | 8/2001 | Crisp ......................... 455/575 |

FOREIGN PATENT DOCUMENTS

| | | |
|---|---|---|
| EP | A2792055 | 8/1997 |
| GB | 2310560 | 8/1997 |
| WO | 9209163 | 5/1992 |

* cited by examiner

Primary Examiner—William Trost
Assistant Examiner—Congvan Tran
(74) Attorney, Agent, or Firm—Antonelli, Terry, Stout & Kraus, LLP

(57) ABSTRACT

A radio telephone is provided with a body (3) and a cover (2) arranged for relative sliding movement with the body (3). The radio telephone also comprises guide means for guiding the relative sliding movement, the guide means comprising a guide track on the cover (2) and a guide rail on the body (3). The guide rail extends along a portion of the guide track when the cover irrespective of the relative positions of the cover (2) and body (3) and the force between the cover (2) and body (3) is substantially constant over a range of positions along the guide track, which leads to a tactile improvement for the user. Alternatively, the guide rail may be provided on the cover (2) and the guide track on the body (3).

25 Claims, 5 Drawing Sheets

RADIO TELEPHONE

BACKGROUND OF THE INVENTION

The invention relates to a portable telephone, and more particularly to a portable telephone comprising a slidable cover.

There is a tendency nowadays for portable radio telephones to become increasingly lightweight and compact. However, as overall dimensions decrease, it has to be borne in mind that there is a critical minimum dimensional constraint on the separation of the microphone and the earpiece imposed by the distance between the ear and the mouth of the human head, typically around 15 centimetres.

This is addressed in the Nokia 8110 phone, which is depicted in FIG. 1 of the accompanying drawings. This phone 1 comprises a main body 3 and a cover 2 which houses the microphone. When the telephone is not in use, the cover 2 is slid to its closed position as shown in FIG. 1a, the overall length of the telephone then only being approximately 14 centimetres. When in use, the cover is slid into an open position thereby establishing the optimum space in between the earphone and the microphone for convenient use.

As can be seen from FIGS. 1b and 1c, the cover 2 has a sidewall 16 in each side which terminates in an inwardly directed flange 17 which extends in parallel with the transverse direction of the telephone. Correspondingly, the telephone housing 3 is formed with guide tracks 35. When the user applies pressure to the cover to move it between the open and closed positions, these guide flanges move along the guide rails 35.

Whilst this sliding arrangement of the guide rails 35 and flange 17 work well, the aesthetic and tactile qualities of the sliding arrangement could be further improved. One particular weakness is the fact that the user needs to apply more force when initially moving the cover from its closed position to move a certain distance than it does from a partly open position to move it the same distance.

GB 2310560 which relates to an invention implemented in the Nokia 8110, suggests replacing the flanges 17 which run along the length of the cover with discrete guide pins positioned along the length of the cover. However, such an implementation would still have the aforementioned weaknesses.

SUMMARY OF THE INVENTION

According to the present invention there is provided a radiotelephone comprising a first part; a second part arranged for relative sliding movement with the first part, between a closed position in which the first and second parts at least partially overlap and an open position; and guide means for guiding the relative sliding movement, the guide means comprising a guide track on the first part and a guide rail on the second part; wherein the guide rail extends along a portion of the guide track when the second part is in the open and closed position; and the force between the two parts is substantially constant over a range of positions along the guide track.

Such a radio telephone has a substantially constant friction sliding arrangement, which provides a tactile improvement for the user. That is, he can apply substantially the same force to one of the parts to move it a certain distance relative to the other, irrespective of its starting position.

Preferably the first part of the radio telephone is its body and the second part its cover. This provides an aesthetic improvement over conventional slide phones, as guide rails are no longer required down the side of the phone.

Preferably, the guide rail is dimensioned to prevent substantial relative pivoting of the first part about it. Moreover, the width of the guide rail is optionally substantially the same as the width of the guide track. This enables a constant distance to be maintained between the two parts.

The guide rail may comprise a single short flange, or alternatively two pins. It is preferable if the two pins are positioned again to prevent substantial relative pivoting of the parts, and thus to prevent any flapping of the ends of the parts remote from the pins.

Preferably, the pins have curved ends (e.g. hemispherical) as these provide a smaller surface contact area so reducing friction further. Moreover, they have the additional advantage of being able to be readily inserted in the guide tracks should the parts become separated.

Suitably, the guide rail and guide tracks have surfaces made of materials with low friction properties, and yet which are durable to repetitive sliding contact. Preferably, the guide rail is composed of metal and the guide track is composed of plastics.

The guide track may be shaped to angle one part with respect to the other such that, for example, a microphone in a cover part of the telephone may be positioned closer to the user's mouth.

The guide track may be a groove. This eliminates the need for end stops and thus reduces the number of parts required for the sliding mechanism.

The telephone may comprise one or more latches for latching the first and second parts at certain positions. For example, it may comprise a latch for latching the parts in the closed position and/or open position and/or any intermediate position (for example an intermediate position at which only the function keys are revealed). The latch may comprise a resilient arm with a protection on one part of the telephone and a corresponding protrusion, for interfering contact with the projection, on the second part.

The telephone may also comprise further features such as a catching mechanism which ensures that when in the closed position the surfaces of the first and second parts of the telephone are in alignment.

BRIEF DESCRIPTION OF THE DRAWINGS

Embodiments of the present invention will now be described, by way of example, with reference to the accompanying drawings, of which.

DETAILED DESCRIPTION OF THE INVENTION

Figure 1A:
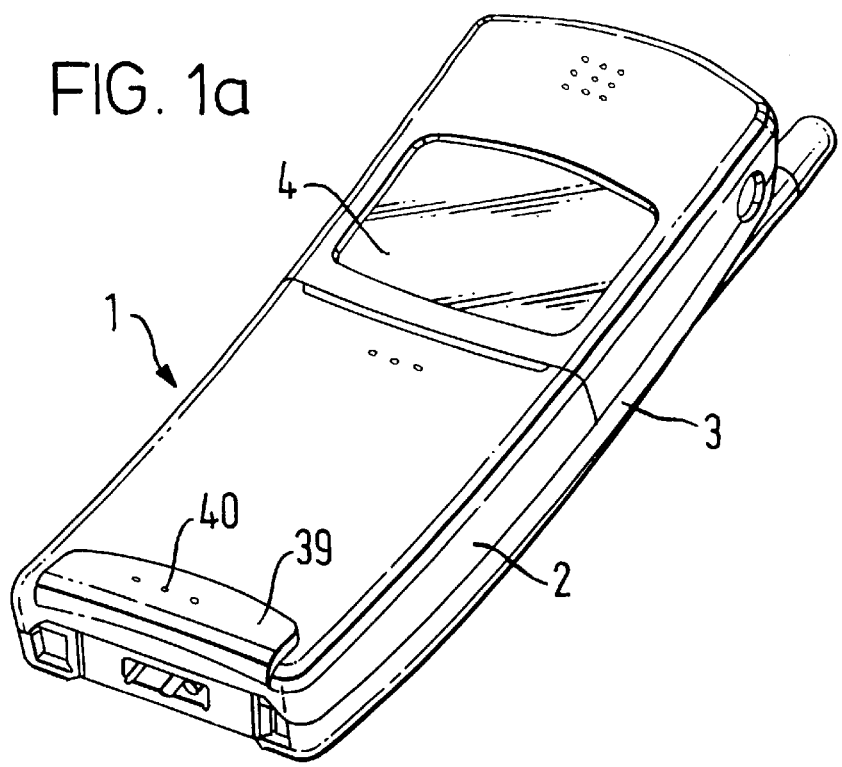
FIG. 1 shows a known portable telephone with a slidable cover.
Figure 1B:
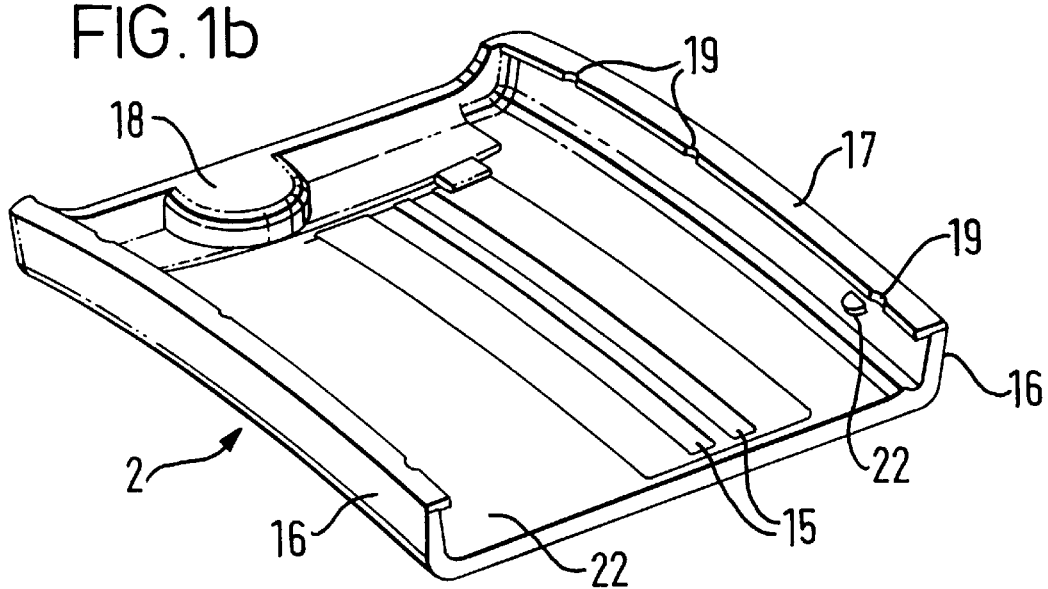
Figure 1C:
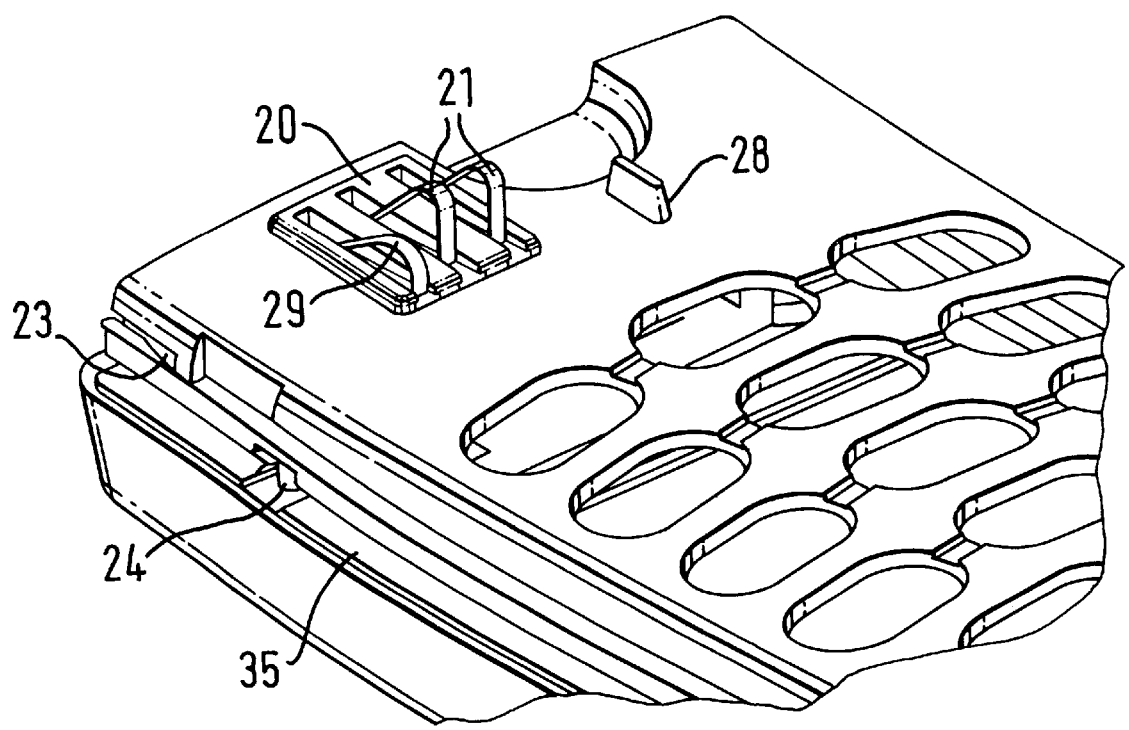
Figure 2:
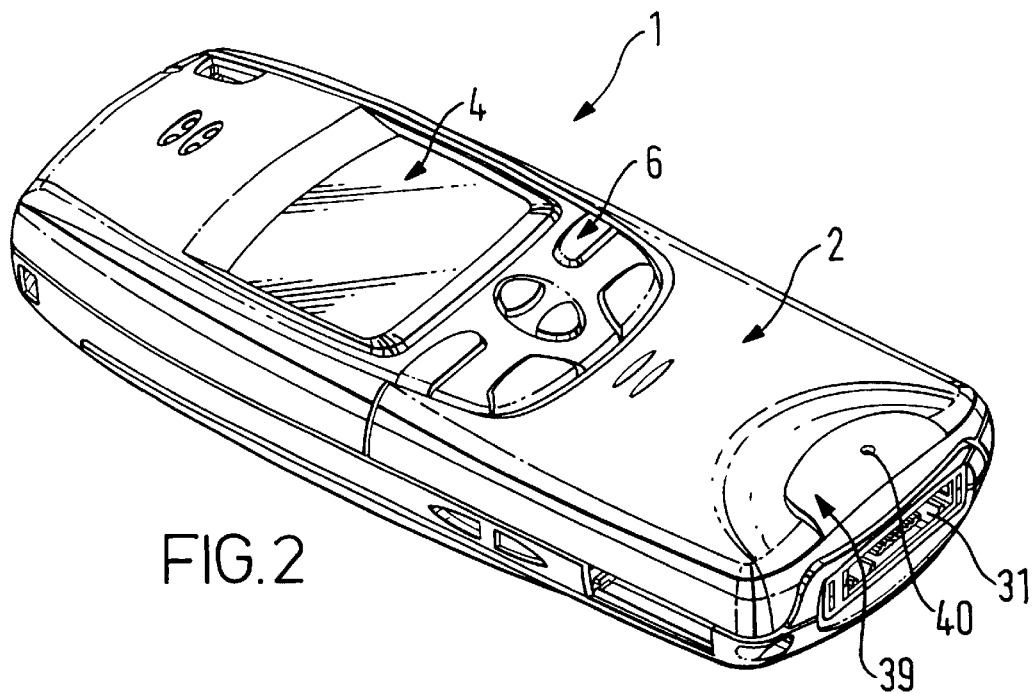
FIG. 2 shows a preferred embodiment of a portable telephone of the invention with the cover partly covering the operating face of the telephone, thus making some of the operating push buttons accessible.
Figure 3:
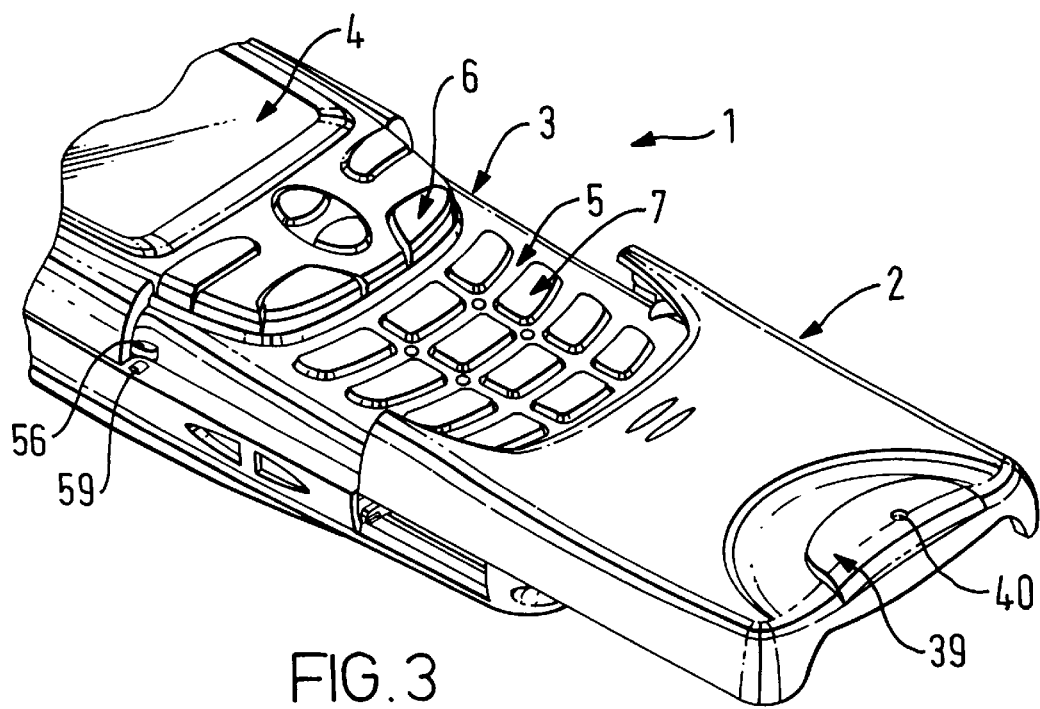
FIG. 3 shows the embodiment of the telephone of the invention shown in FIG. 1, with the cover pulled away from the operating face of the telephone thus making all the operating push buttons accessible.
Figure 4:
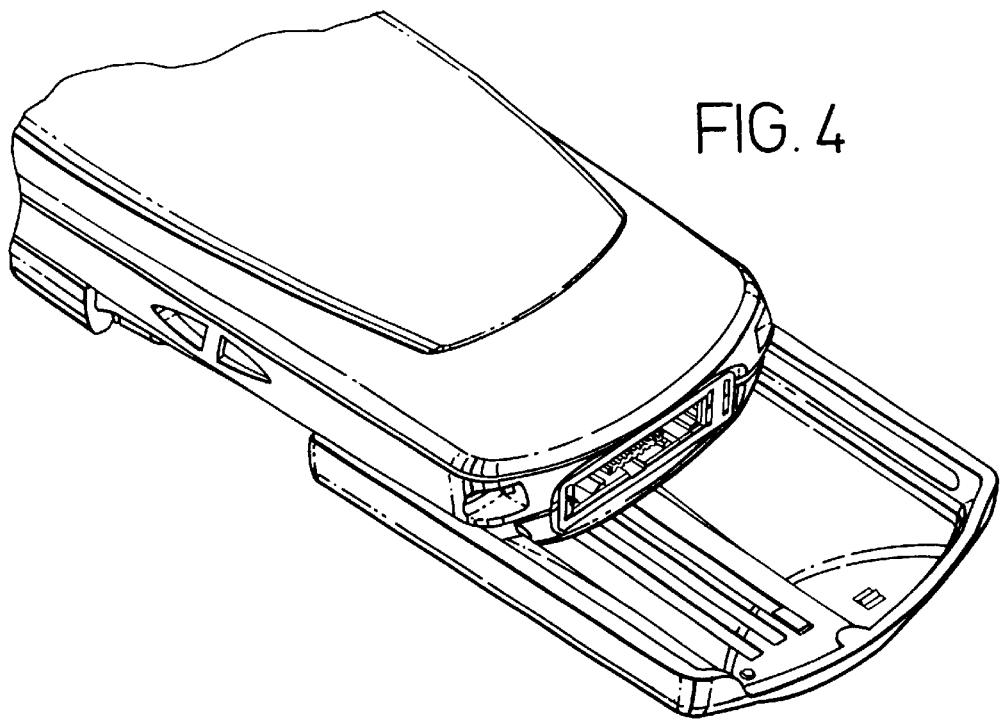
FIG. 4 shows the embodiment of the telephone of the invention shown in FIG. 1 with the cover pulled away from the operating face of the telephone, from the rear.

A preferred embodiment of a portable telephone 1 of the invention is shown in FIGS. 2–4. The telephone 1 has a microphone arranged in the slidable cover 2 and an operating face 5 which may be covered partly by the slidable cover 2. The rear face of the cover 2 is formed with a plurality of metallic conductors 15 (see FIG. 6), which are connected to the microphone, and which extend in the direction of the sliding movement of the cover 2. The housing 3 of the telephone 1 is formed with a connector means 20 (see FIG. 7) in the form of slide shoes 21 for co-operation with the conductors 15. The slide shoes 21 may advantageously be resilient. Further, the housing 3 is constructed with a display 4 to display, for example, call numbers, telephone menus, reception conditions, battery status, and games.

In this ermbodiment, the housing 3 has a front part 61 and a rear part 62. The rear part 62 is wider than the front part 61 each side by an amount substantially equal to the thickness of the cover's sidewall 16 each side, so that the line of each side of the phone housing 3 is substantially continuous.

In this embodiment the housing 3 and the cover 2 of the telephone are of plastics with a painted outer coating to provide an aesthetically pleasing telephone. More specifically, the housing 3 is made of an ABS polycarbonate and the slide is made of xantar (a blend of Polytetrafluoraethylene (PTFE) to reduce friction and glass fibre to provide stiffness). These materials are not essential to the invention. However, it is preferable that the materials of the parts of the housing 3 and cover 2 which are in contact provide mobility between the parts. Further, the contacting parts ideally have a perfect surface finish. Finally, the contacting parts should have a good mechanical stability. These properties may be obtained by using a polycarbonate (PC) to which polytetrafluoraethylene (PFTE) is added and/or metal. The selection of materials is to impart a "self-lubricating effect" to the contacting parts.

Relative sliding between the housing 3 and cover 2 is provided by grooves 17 in the side wall 16 of the cover 2 and a corresponding pair of projections or pins 35 for each groove 17, extending from the sidewalls of the front part 61 of the housing 3 and positioned towards the bottom of the housing 3. Thus, displacement between the cover 2 and the housing 3 is determined by the shape of the grooves 17. In this embodiment, the housing 3 and cover 2 are substantially flat. However, as can be seen from FIG. 6, the grooves 17 are angled, such that when the cover is open, or fully extended from the phone (see FIG. 3), the cover is no longer parallel to the operating face of the phone, but is instead angled acutely with respect to the operating face 5. In this manner, the slide brings the microphone closer to the user's mouth. It also gives room between the cover 2 and the bottom connector 31 to alleviate the size restriction requirements on accessories such as car kits, chargers etc, which need to connect to this bottom connector 31.

In an alternative embodiment, the microphone may be brought closer to the user's mouth, by curving the housing 3 and the cover 2 slightly about an axis of curvature which extends in parallel with the transverse direction of the telephone. In this case, the grooves 17 of the cover 2 follow this curvature and the pin 35 of the housing 3 slides along the grooves 17 to provide displacement between the cover 2 and the housing 3 along the circular arc. The curvature is relatively slight, since the radius of the circle along which the movement takes place is large with respect of the length of the telephone.

Figure 5:
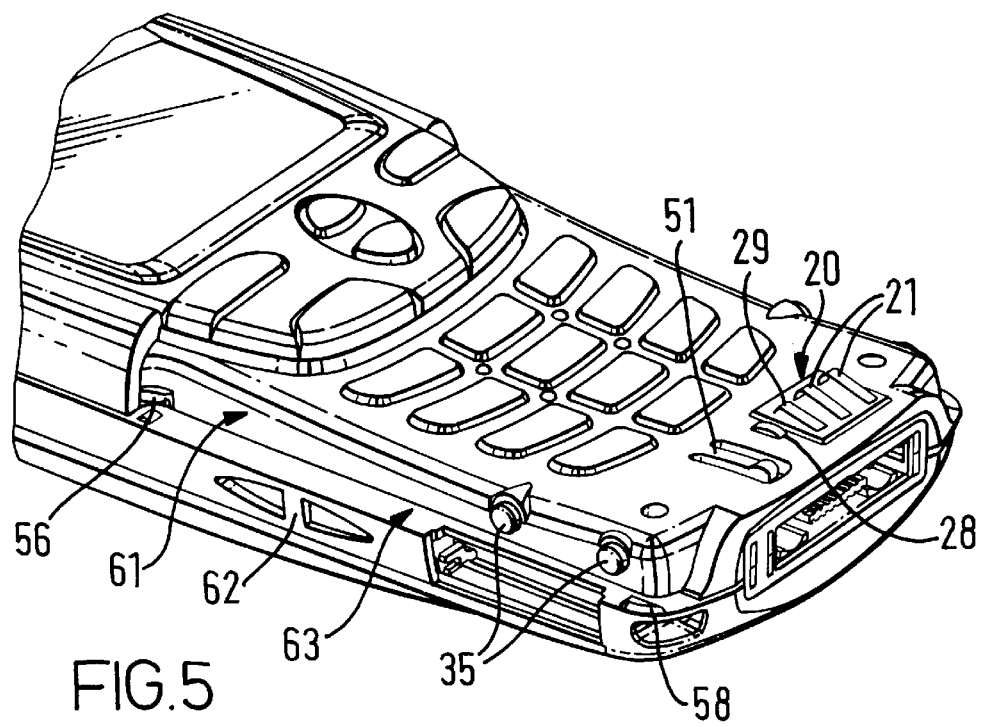
FIG. 5 shows the structure of the main body of the telephone of the invention: shown in FIG. 1.

As can be seen from FIG. 5, in this embodiment the pins 35 extend from side walls of the front part 61 of the housing 3 and are provided towards the bottom of the phone. The upper most pair of pins limit the extension of the cover from the phone. Consequently, these pins are positioned such that the cover can extend sufficiently to be in its open position, at which the group of push buttons 7 is accessible. Similarly, the lower most pair of pins are positioned such that they do not restrict the closing of the cover to its closed position shown in FIG. 2.

Two pairs of pins 35 are associated with each groove 17, to prevent unwanted pivoting of the cover which would occur about a single pair of pins.

In this emlibodiment, the pins 35 are made of metal (e.g. brass), as metal is durable against repetitive sliding contact with the cover 2 which, as mentioned above, is manufactured in xantar. Further, the ends of the pins 35, are shaped hemispherically to provide two main advantages. Firstly, by the ends of the pins being hemispherical, they have a reduced contact area with the cover so that friction is reduced. Secondly, for reasons of safety, the cover 2 is given resilient properties which are sufficient to ensure that twisting of the cover 2 with respect to the telephone housing 3 does not result in elastic deformation of the cover 2 so that its side walls 16 with the grooves 17 are disengaged from the pins 35 on the telephone housing 3. For this reason, the pins have a curved surface so that they can permit the cover to be readily reattached over them. Also, the diameter of the pins is chosen to be close to the width of the grooves, so as to prevent unwanted movement of the cover 2.

Use of a pin and groove arrangement for coupling the housing 3 and cover 2, provide a more constant friction sliding movement between the cover's open and closed positions. This is, in part, due to the fact that the same force is applied by the ends of the pins, no matter what position the cover is in. Also, the pins apt as stops, preventing removal of the cover 2 from the housing 3 by pulling it too far from the telephone 1, thus simplifying the mechanical structure of the telephone.

Moreover, the use of grooves 17 on the cover 2 and pins 35 on the housing 3 provide an aesthetic improvement in the telephone 1, as the sides of the telephone can be smooth and elegantly contoured.

In the position shown in FIG. 2, the cover 2 covers part of the operating face 5 of the telephone. In the case of an incoming call, this may be answered without having to slide the cover 2, as a first group of operating push buttons 6 is accessible. This first group of operating push buttons may comprise a push button for answering a call, a push button for terminating a conversation, and menu control push buttons for operating programmed menu facilities of the telephone. Additional displacement of the cover 2 to the position shown in FIG. 3 makes the final group of operating push buttons 7 accessible, said group comprising essentially alphanumerical push buttons used for establishing a call or for programming the telephone.

In this preferred embodiment, the cover 2 has a window for providing access to the first group of operating push buttons 6 when the cover is closed and the second group of operating push buttons 7 when the cover is open. Consequently, such an arrangement reduces the length of movement of the cover required to access the full operating face, and thus assists miniaturization of the phone where required.

However, in an alternative embodiment, the cover is arranged such that when it is in the closed position, as shown in FIG. 2, the cover 2 covers the entire operating face 5 of the telephone. In the case of an incoming call, this may be answered by sliding the cover 2 to the position at which the first group of operating push buttons 6 is accessible. Further, the call may be answered merely by displacing the cover 2 as will be explained later. Additional displacement of the cover 2 to the position shown in FIG. 3 makes the final group of operating push buttons 7 accessible.

Figure 6:
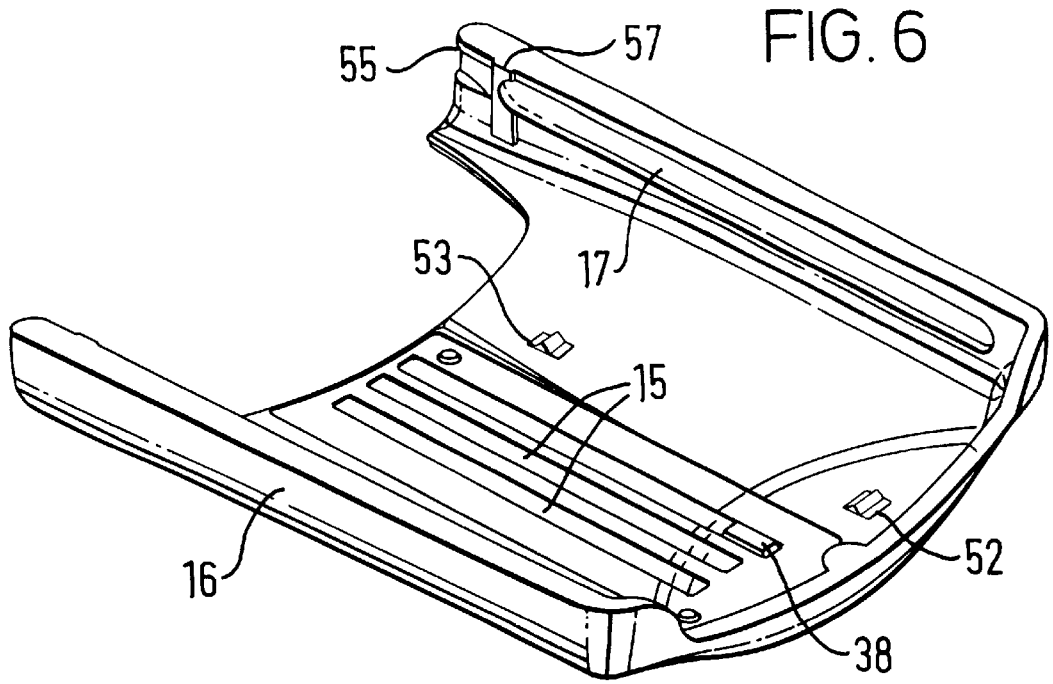
FIG. 6 shows the structure of the rear of the cover of the telephone of the invention shown in FIG. 1.

To implement further tactile improvements to the phone, in the preferred embodiment, the phone is provided with latching mechanisms for latching the cover 2 in its open and closed position. The latching mechanism comprises a cantilever arm 51 on the housing 3, which is resiliently biased away from the housing 3 and two protrusions 52 and 53 on the inner surface of the cover 2. As the cover is slid towards its open position, the protrusion 53 contacts arm 51, causing it to be depressed sufficiently to the protrusion 53 to pass over it. The arm 51 then springs back to its normal position, preventing further movement of the cover 2 towards its closed position without external pressure being applied to force the protrusion back over the arm. Similarly, when the cover is slid to the closed position, the force applied by the user causes the protrusion 52 to depress the arm 51 and ride over it. The arm 51 is cleared and return's to its normal position, thus providing a block for the protrusion 52. The protrusions are preferably ramped as shown in FIG. 6 to provide a smooth transition. Latching, such as that shown provides the user with a sensory indication that the cover is in the open/closed position.

In this preferred embodiment, the telephone 1 is also provided with a further latching mechanism to ensure that the cover 2 is maintained at the appropriate position when closed, for example having regard to the profile of the telephone. This further latching mechanism comprises a cover lift catch face 55 on each side wall of the cover 2 and corresponding faces extending from the sidewalls of the front part 61 of the housing 3. As the cover 2 is closed, the faces 55 of the cover 2 slide along corresponding faces 56 of the housing until slide travel stops. The tapering of the faces 55 and 56 with respect to the sidewall of the cover 2 and front part 61 of the housing 3 assist in providing a frictional force which assists in maintaining the cover 2 in position. The housing 3 further comprises a ramp 58 on each lip 63 of its rear part 62, positioned towards the bottom of the telephone. This ramp 58 tilts the cover 2 to ensure that the cover lift catches 55, 56 engage on closure. Furthermore, a covering positioning protrusion 59 is provided on the lip 63 of the rear part 62 of the housing 3 to raise the cover 2 if necessary so that the front face, of the cover 2 and the accessible portion 6 of the opening face 5 are flush.

Also, the housing 3 comprises a spacer pin 28 which supports the cover 2 when this is affected by a pressure on the telephone front face. This avoids separation by compression. Further it comprises a slide travel stop 57 as an additional mechanism to prevent the user from forcing the cover and phone apart.

Moreover, the cover 2 has a ridge with one or more apertures 40 through which the sound may pass. The ridge 39 may comprise a removable cover provided so that the microphone can be easily mounted within the cover 2 below the ridge 39.

Figure 7:
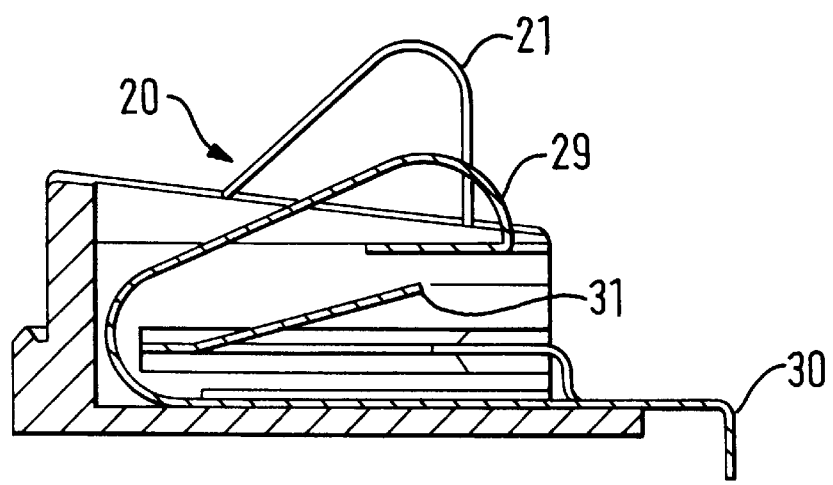
FIG. 7 shows the structure of the connector means of the telephone of the invention.

The connector means 20 shown in FIG. 7 has the position shown in FIG. 5 in the preferred embodiment of the telephone of the invention. The connector means 20 comprises two slide shoes 21 which, upon displacement of the cover 2, slide against the respective conducting path 15 and ensure a good electric connection in spite of the movement. It has been found that it is possible to transfer electric signals almost without noise—even when the cover 2 is displaced.

The connector means 20 has a microswitch actuator 29 at the side of the slide shoes 211. In the closed position of the cover 2, the microswitch actuator 29 co-operates with an actuation bar 38 on the cover 2, causing the microswitch actuator 29 to be pressed down to engage another contact part 31, thereby closing a current path. It is hereby possible to detect when the cover 2 is in the position shown in FIG. 2, the microswitch being closed here. When the current path in the microswitch is interrupted, a call may be answered without it being necessary to operate other push buttons. The conversation is terminated subsequently by closing the current path. The microswitch has two legs 30 which are connected to the PCB of the telephone, while each of the slide shoes 21 has one leg 30.

The slide, shoes 21 have resilient properties to compensate for variations in the distance between the cover 2 and the housing 3. The slide shoes and the microswitch actuator 29 are constructed as connector springs and are plated with 20 $\mu$m palladium nickel coated with 2 $\mu$m hard gold. The conducting paths 15 (slide flex) are plated with 5 $\mu$m hard gold. This ensures a wear-resisting and reliable electric connection.

The present invention includes any novel feature or combination of features disclosed herein either explicitly or any generalisation thereof irrespective of whether or not it relates to the claimed invention or mitigates any or all of the problems addressed.

In view of the foregoing description it would be evident to a person skilled in the art that various modifications may be made within the scope of the invention. For example, it is evident that the positioning of the pins on the front part of the phone is not essential: they could alternatively be positioned on the rear part, or indeed on the cover for reception by grooves on the housing. Furthermore, the cover need not overlap the operating face of the phone to provide protection. Instead, its main purpose could be to extend the length of the phone when necessary. It could cover the rear of the phone when in its closed position and, for example, extend from the top of the phone if it comprises an earpiece and from the bottom of the phone if it comprises a microphone. Alternatively, both the cover 2 and the housing 3 could bear operating faces, which face each other when the cover 2 is closed. For example, the housing could comprise a display and function keys and the cover alphanumeric keys.

What is claimed is:

1. A radiotelephone comprising:
    a first part;
    a second part arranged for relative sliding movement with the first part, between a closed position in which the first and second parts at least partially overlap and an open position; and
    guide means for guiding the relative sliding movement, the guide means comprising a guide track on the first part and a guide rail on the second part;
    wherein contact between the guide rail and the guide track extends along a portion of the guide track when the second part is in the open and closed position,
    wherein a force between the two parts is substantially constant over a range of positions along the guide track, and wherein the extent of the contact between the guide rail and the guide track is maintained over the range of positions.

2. A radiotelephone as claimed in claim 1, wherein the first part is the body of the telephone, and the second part a cover.

3. A radiotelephone as claimed in claim 1, wherein the guide rail is dimensioned to prevent substantial relative pivoting of the parts about it.

4. A radiotelephone as claimed in claim 1, wherein the width of the guide rail is substantially the same as the width of the guide track.

5. A radiotelephone as claimed in claim 1, wherein the guide rail comprises two pins.

6. A radiotelephone as claimed in claim 5, wherein the pins have curved ends, preferably hemispherical.

7. A radiotelephone as claimed in claim 1, wherein the guide rail is composed of metal and the guide track is composed of plastics.

8. A radiotelephone as claimed in claim 1, wherein the guide track is shaped to angle on part with respect to the other.

9. A radiotelephone as claimed in claim 1, wherein the guide track is a groove.

10. A radiotelephone as claimed in claim 1, further comprising a latch for latching the first and second parts at a predetermined relative position.

11. A radiotelephone as claimed in claim 10, wherein the latch comprises a resilient member on one part and a protrusion on the other part.

12. A radiotelephone as claimed in claim 11, wherein the latch comprises a plurality of protrusions for latching the first and second parts at a corresponding plurality of predetermined positions.

13. A radiotelephone as claimed in claim 1, comprising means for aligning the surfaces of the first and second parts when in the closed position.

14. A radiotelephone as claimed in claim 1, comprising guide means on each side.

15. A radiotelephone as claimed in claim 2, wherein the guide rail is dimensioned to prevent substantial relative pivoting of the parts of it.

16. A radiotelephone as claimed in claim 2, wherein the width of the guide rail is substantially the same as the width of the guide track.

17. A radiotelephone as claimed in claim 3, wherein the width of the guide rail is substantially the same as the width of the guide track.

18. A radiotelephone as claimed in claim 2, wherein the guide rail comprises two pins.

19. A radiotelephone as claimed in claim 3, wherein the guide rail comprises two pins.

20. A radiotelephone as claimed in claim 4, wherein the guide rail comprises two pins.

21. A radiotelephone as claimed in claim 2, wherein the guide rail is composed of metal and the guide track is composed of plastics.

22. A radiotelephone as claimed in claim 3, wherein the guide rail is composed ed of metal and the guide track is composed of plastics.

23. A radiotelephone as claimed in claim 4, wherein the guide rail is composed of metal and the guide track is as composed of platstics.

24. A radiotelephone as claimed in claim 5, wherein the guide rail is composed of metal and the guide track is composed of plastics.

25. A radiotelephone as claimed in claim 6, wherein the guide rail is composed of metal and the guide track is composed of plastics.

* * * * *